Nov. 18, 1969 D. A. BURGESS 3,479,121

EXPOSURE DEVICE

Filed Feb. 28, 1968 4 Sheets-Sheet 1

INVENTOR.
DENNIS A. BURGESS
BY
Adams Cwayna & Haugen
ATTORNEYS

INVENTOR.
DENNIS A. BURGESS
BY
Adams Ouayna & Haugen
ATTORNEYS

Nov. 18, 1969 D. A. BURGESS 3,479,121

EXPOSURE DEVICE

Filed Feb. 28, 1968 4 Sheets-Sheet 3

INVENTOR.
DENNIS A. BURGESS

BY

Adams Onayna & Haugen

ATTORNEYS

Nov. 18, 1969 D. A. BURGESS 3,479,121

EXPOSURE DEVICE

Filed Feb. 28, 1968 4 Sheets-Sheet 4

INVENTOR.
DENNIS A. BURGESS

BY

Adams Quayna & Haugen
ATTORNEYS 3,479,121

EXPOSURE DEVICE

Dennis A. Burgess, Minneapolis, Minn., assignor to Colight, Inc., Minneapolis, Minn., a corporation of Minnesota Filed Feb. 28, 1968, Ser. No. 708,829
Int. Cl. G03b *27/04*
U.S. Cl. 355—85 12 Claims

ABSTRACT OF THE DISCLOSURE

Exposure equipment particularly suited for exposing plates which will be exposed to chemical etching processes where it is necessary to etch both sides of, for example, a printed circuit plate. The device includes a first vacuum clamping frame for holding the negatives and the plate to be exposed, such unit having transparent sides to permit the passage of the exposure light therethrough and a light unit consisting of a pair of exposure light sources disposed on opposite sides of said clamping frame with means for moving the exposure light sources across the frame at predetermined rates of speed. The device includes a vacuum system for positively holding the negatives to the plate and safety means which will prevent operation of the unit unless all systems are in a safe operable position. The exposure light arrangement is arranged in opposite sides of the holding frame to permit exposure of both sides of the plate at the same time and therefore eliminate a two step operation when it is necessary to expose both sides of a plate.

Utilization of photographic processes and photographic exposure processes for exposing plates prior to chemical etching or chemical milling processes is well known in the art. Applicant's device will permit exposing both sides of a sensitized plate at the same time therefore eliminating the now used two step process. The present processes used to expose both sides of the plate usually include complete rotation of the holder device to re-expose the opposite side of the plate or to open the holder and turn the sensitized plate and image thereon for the required second exposure.

In using the device provided by applicant various safety mechanisms are provided to insure proper operation of the unit and to prevent operation of the unit if the various components of the unit are not properly aligned for operation.

It is therefore an object of applicant's invention to provide an exposure device capable of exposing both sides of a sensitized plate at the same time to prepare both sides of the sensitized plate for chemical milling or other etching processes.

It is still a further object of applicant's device to provide holding apparatus for properly positioning a sensitized plate with image plates or images on both sides thereof for exposure of both sides of the sensitized plates in one step.

It is still a further object of applicant's device to provide a dual exposure light system for an exposure device which incorporates a pair of spaced light source elements disposed on either side of a holding device with means for driving the elements therepast to provide means for illuminating and exposing the material held within the holder frame.

These and other objects and advantages of my invention will more fully appear from the following description made in connection with the accompanying drawings, wherein like reference characters refer to the same or similar parts throughout the several views, and in which.

Figure 1:
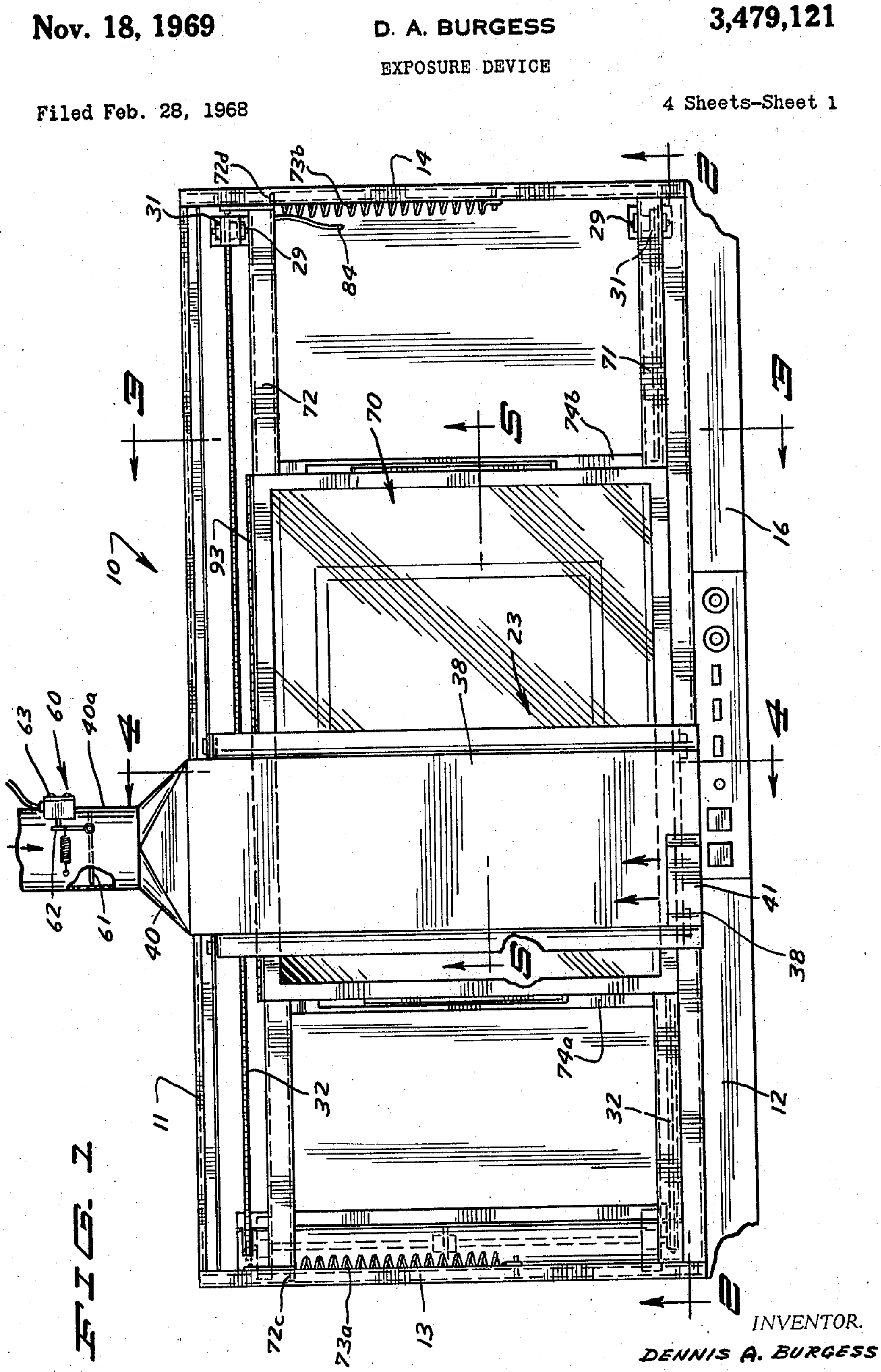
FIG. 1 is a top plan view of the exposure device embodying applicant's concepts with certain portions thereof broken away for clarity.
Figure 2:
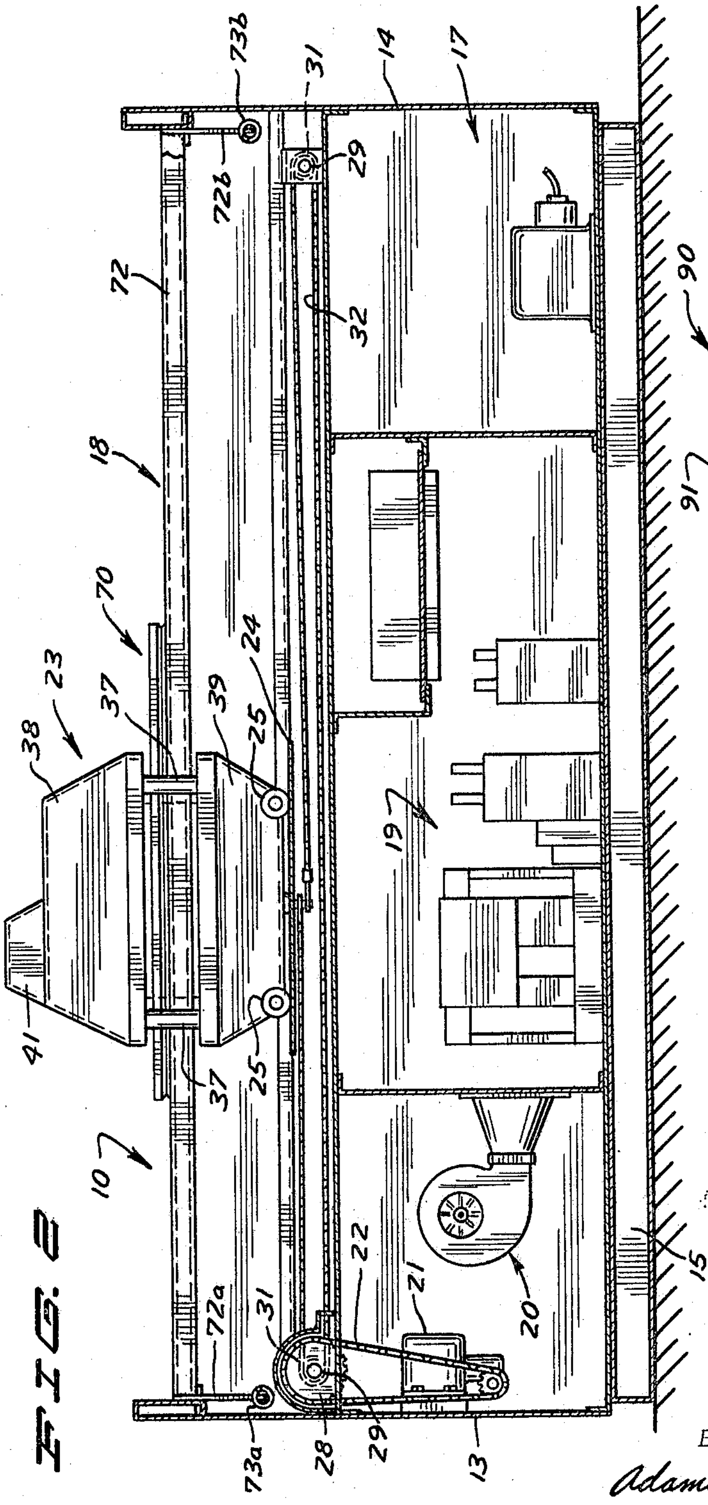
FIG. 2 is a vertical section taken substantially along line 2—2 of FIG. 1.
Figure 3:
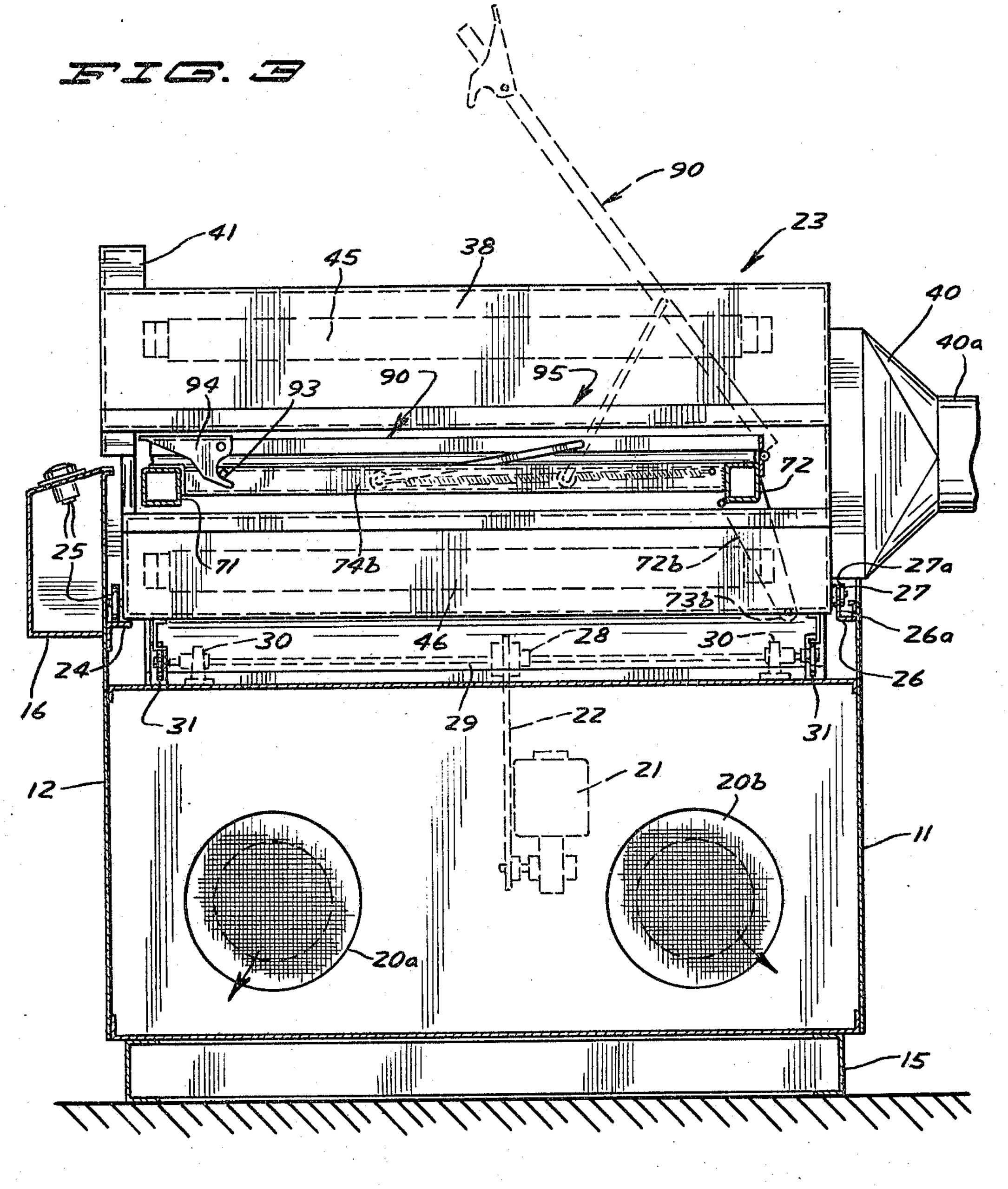
FIG. 3 is a vertical section taken substantially along line 3—3 of FIG. 1 illustrating certain portions of the invention in their available alternative positions.

As shown in the accompanying drawings and best illustrated in FIGS. 1, 2 and 3 the exposure device generally designated 10 includes a frame and housing portion 17 and an exposure area 18. Frame and housing 17 includes a pair of transversely spaced side elements 11–12 and end elements 13–14. These side and end elements are upstanding and designed to provide support for the various elements of the unit and room for housing the various operative elements of the unit. These side and end elements are shown mounted on a base 15 to provide a mounting surface and additional strength to the unit. A front control panel 16 is provided for mounting of the various control and signal devices thereon. Housing portion 17 contains, for example, the various electrical and mechanical power elements of the unit necessary to provide the electrical power to the exposure light sources and is provided in the form shown with a fan device 20 for maintaining these elements at a proper operating temperature. Outlets **20*a*–20*b* would logically be provided for permitting air flow through the unit. Again within the housing portion 17 a motor 21 is provided which through a chain 22 system will provide the propelling force for the exposure light carrying unit 23.**

A pair of frame members particularly shown in FIGS. 2 and 3 a first of which is designated 24 extend longitudinally of the unit adjacent the front side 12 thereof and provides a flat guide surface for a set of roller members 25–25 to move thereover for support of the light unit 23 as it is moved from one end of the device 10 to the other. The second of said support members 26 is positioned adjacent the rear side 11 of the unit and consists, in the form shown, of a generally U-shaped bracket to provide an upstanding guide arm **26*a* of such U as a guide element. A roller member 27 is provided with a groove 27*a* therearound for guiding upon the upstanding arm 26*a* of the U-shaped bracket 26 and the exposure member 23 is mounted between these sets of rollers 25–27.**

Propelling force for the exposure unit 23 is provided through the afore-mentioned motor 21 and chain drive 22 which drive through a sprocket device 28, a drive shaft 29 provided with bearings 30—30 at the transversely spaced ends thereof. This drive system as shown in FIG. 2 is arranged in relatively adjacent position with respect to the aforementioned roller and guide assemblies 24–25–26–27. A pair of drive sprockets 31 are provided on the respective ends of drive shaft 29 and a like drive shaft and sprocket arrangement again designated 29–31 is arranged on the opposite end of the unit and a drive chain 32 is provided to pass around this sprocket and shaft system to provide the propelling force for the exposed unit 23. As illustrated a pair of downwardly extending brackets 33—33 are provided on the respective ends of the exposure unit 23 arranged on the bottom surface 34 thereof to provide means for attaching the same directly to the aforementioned drive chain 32. It is obvious that this drive connection can be provided in many ways and applicant does not wish to be limited to this specific embodiment. The motor 21 for driving the chain 32 is of the variable speed type and may be controlled to govern the speed of travel of the exposure device 23 across the unit in accordance with the desired exposure time for the particular plates being exposed.

Figure 5:
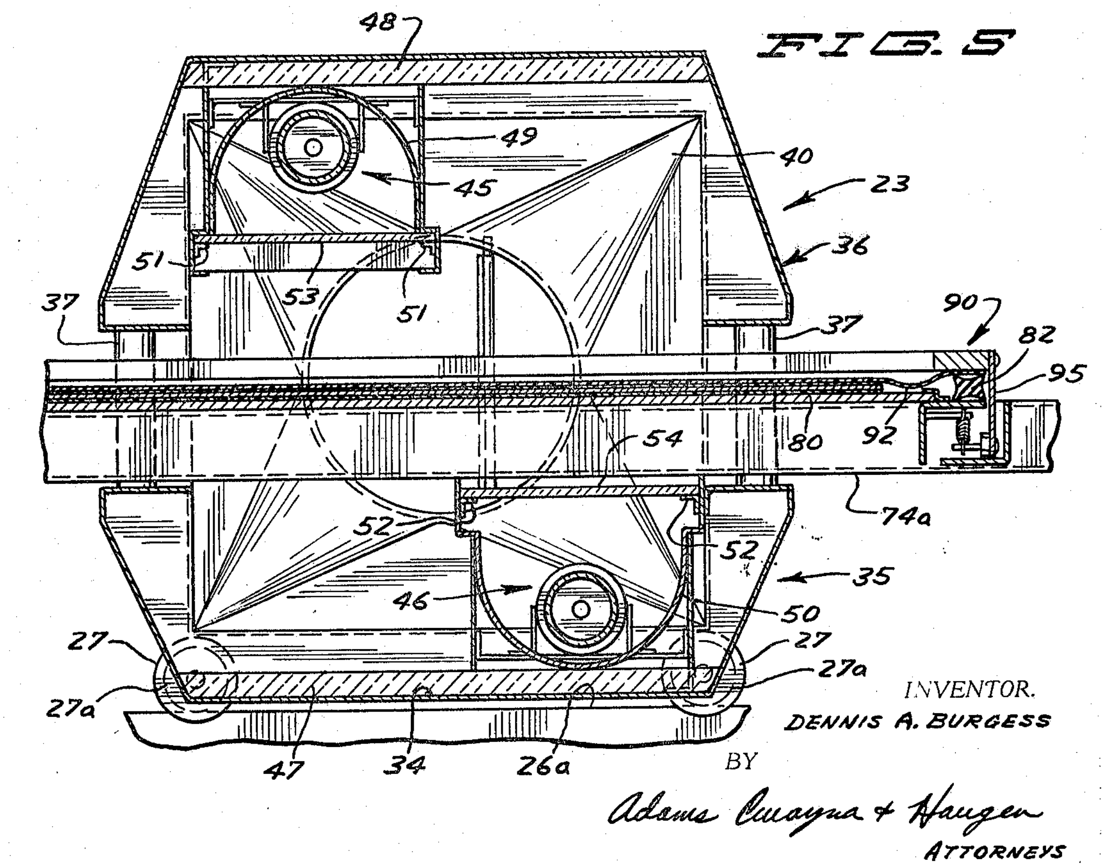
FIG. 5 is a vertical section taken substantially along line 5—5 of FIG. 1.

The exposure device 23 is best illustrated in the cross section of FIG. 5 and includes a pair of trapezoidal shaped housings 35–36 which housings 35–36 are spaced vertically through pairs of stand off elements 37 on the transversely spaced ends thereof. These housings 35–36 are provided with a closed end 38–39 facing the front side 12 of the unit and extend rearwardly therefrom to an air funneling end section 40 which is common in nature and joins both of the housings 36–35 at the rear side 11 of the unit. An air intake 41 is provided on the top housing 36 to provide for air flow into the housing structure for cooling of the illuminating sources 45–46 contained therein. In the form shown the housings may be provided with insulating material 47–48 at the upper and lower surfaces thereof.

Figure 4:
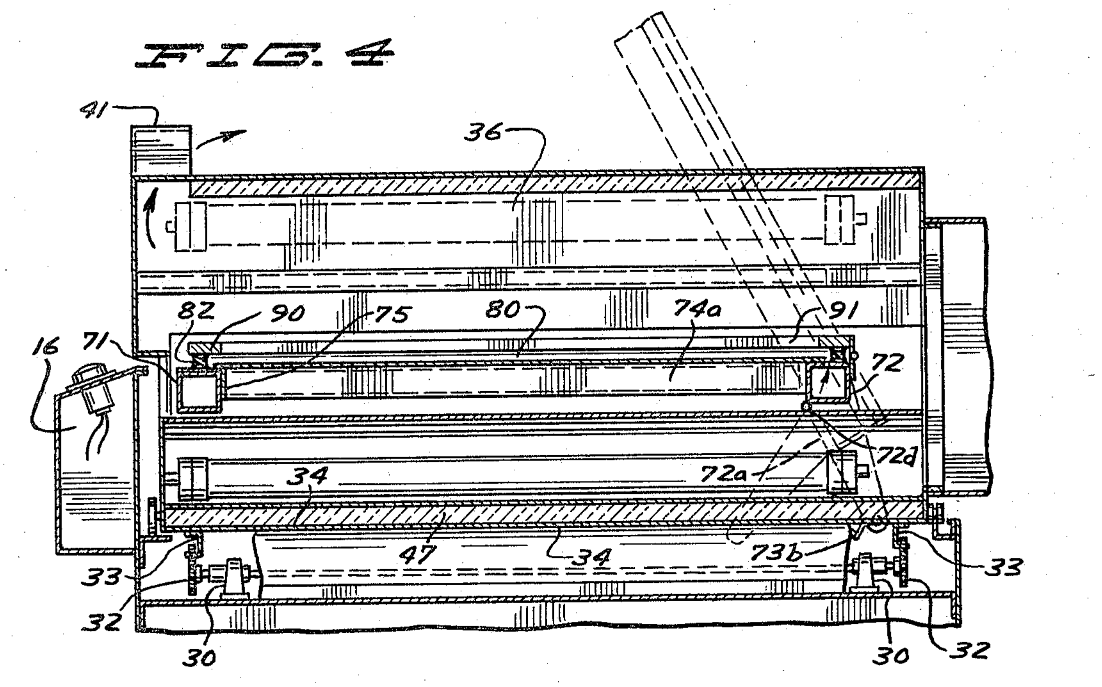
FIG. 4 is a vertical section taken substantially along line 4—4 of FIG. 1 showing portions thereof in their alternative positions.

In the form shown as in FIG. 4 the illuminating devices 45–46 extend entirely across the transverse width of the unit and are in the form shown arranged in opposite corners of the housings 35–36. An internal housing arrangement particularly shown in the cross section of FIG. 5 is provided for each of said light sources and includes a first generally arcuate semi-circular reflector device 49–50 to the rear of the light sources 45–46 with appropriate means for mounting such reflector device to the respective housing 35–36 and means including entrapping and supporting frame elements 51–52 for supporting a piece of transparent material such as coated glass directly below and above the respective light sources. in the form shown the housings and light sources are arranged at proper predetermined distances from an exposure plane lying approximately intermediate of the light sources 45–46 for proper equal exposure of the devices to be exposed which are held on the exposure plane. The aforementioned glass plates 53–54 are of a specific design and are coated with an infra-red reflecting material. The concept of coating this glass is to prevent the passage of infra-red onto the exposure frame while allowing the passage of essential exposure rays therethrough. If this infra-red were allowed to pass onto the exposure area this of course would increase the heat difficulties encountered and the reflective material prevents this heating situation.

Mounted in the aforementioned common housing end 40 of FIG. 1 which end 40 leads to a duct section **40*a* and to a remote air suction system or the like such that air will be drawn through the housing sections 35–36 for cooling of the lamps, is an air moving sensing device and fail-safe device generally designated 60. Devices such as these are well known in the art and may include for example, a plate member 61 mounted for swinging movement within the duct 40*a* with a spring loaded control arm 62 attached for movement therewith into contacting and tripping position with respect to a control switch 63. The control switch 63 is in this particular installation a master control mechanism such that if no air is moving through the duct 40 or insufficient air is moving through the duct 40 the switch will normally be open and it will be impossible to operate the exposure unit. When sufficient air is moving through the unit to maintain the unit at a proper operating temperature then the movement of the air sensing plate 61 will force the attached arm 62 against the switch 63** and energize the same thereby permitting the unit to be turned on. Obviously many ways could be provided to accomplish this same control based on the air movement through the housing.

Figure 6:
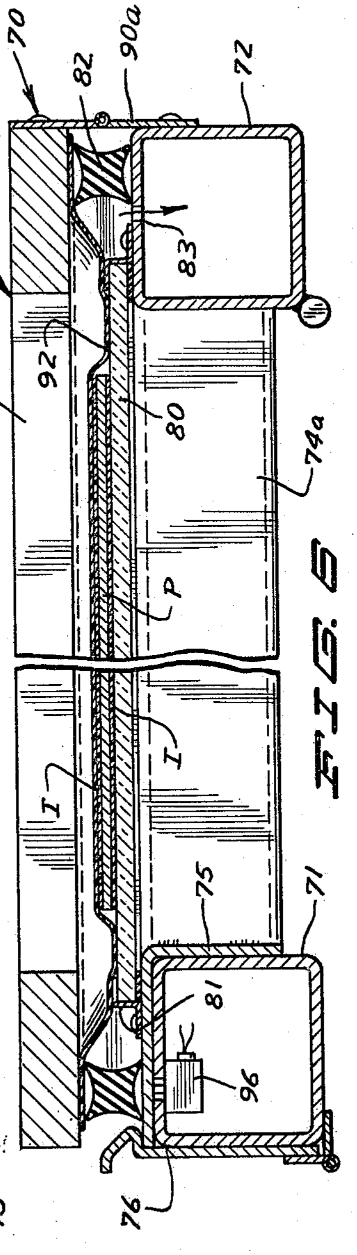
FIG. 6 is a section taken through the plate holding portion of the device.

The actual exposure frame device is generally designated 70 and a cross section thereof is provided in FIG. 6. To properly support this vacuum frame structure 70 a first front support member 71 is provided to extend longitudinally of the unit and in the form shown this support member 71 is of tubular square construction and is rigidly attached to the ends 13–14 of the unit. A second similar support member 72 is provided at the rear side of the machine spaced transversely from the front support member 71 and this support member 72 is provided with downwardly depending arms **72*a*–72*b* particularly shown in FIGS. 2, 3 and 4 at the ends thereof. Member 72 is pivotally mounted on pins 72*c*, 72*d* on the ends thereof which pins extend to the end support elements 13, 14. Counterbalance springs 73*a*, 73*b* are attached to the lower ends of arms 72*a*, 72*b* to assist in rotating support member 72 from horizontal exposure position into a tilted position as shown in FIG. 4. Attached to this support member 72 is a lowermost portion of the vacuum frame device 70. This lowermost portion provides a frame consisting of transversely extending side elements 74*a*–74*b* rigidly attached to a front support element 75. This front support element 75 is in the form shown of a shape to be compatible with the front support member 71 so as to be received positively thereon and thereagainst when in lowered position. A snap or lock device such as a spring loaded clamp element 76 is provided on the front support member 71** to engage with and hold down the lower supporting frame section.

A first glass or transparent support member 80 is mounted on the lower support frame structure and is held thereto by a clamp device 81 which may extend entirely therearound. This support glass or plate serves as a support for the sensitized plate P and the image plates I during the exposure process.

A seal member 82 is provided on the lower support frame to completely circumscribe the first mentioned supporting plate 80 and in the form shown has a cross-sectional known as a quad-ring. It should be noted that this quad-ring is of a size to not only circumscribe the plate 80 but also to be arranged outwardly of a vacuum passage 83 formed in the second mentioned support member 72. It is through this passage 83 that vacuum is introduced into the exposure frame area to hold the articles to be exposed in proper position therein. This vacuum passage 83 communicates with the interior of the hollow support member 72 which member provides vacuum communication one end of the support member 72 where a vacuum line 84 shown in FIG. 1 is provided to introduce vacuum into this member 72 and thus into the clamping area. The vacuum line 84 will naturally have to be connected to a source of vacuum and this vacuum source is housed in the lower aforementioned housing area 17.

Again with reference to FIG. 6 top closure frame 90 is provided above the glass support plate 70 and includes a frame device providing an opening 91 therethrough with a transparent piece of material such as Mylar 92 positioned over the opening 91 and sealed or adhered to the frame section 90. This Mylar will, being substantially flexible when the top frame 90 is closed upon the seal 82 and upon the introduction of vacuum be pulled down and conform to the exposure plates to positively hold the same in position on the plate 80.

In order to allow access to place the sensitized plate and the image plates in position for exposure, the top frame member 90 is hinged through a hinge structure **90*a* directly to the rear support member 72. A locking device such as particularly illustrated in FIG. 3 consisting of a pin 93 arranged on one of the side elements 74*b* of the bottom frame section and a latching device 94 arranged on the side of frame 90 will provide the locking mechanism for retaining the upper frame 90 onto the bottom frame portion. As also illustrated in FIG. 3 a movable arm arrangement generally designated 95 is provided to permit the upper frame 90** to be raised and held in an upper position while loading the sensitized plates and image plates.

When the upper frame 90 is locked to the lower frame portion it is possible to rotate the entire closed frame about the pivot points **73*a*–73*b* in order to view the entirely closed unit. This possible position is illustrated in FIG. 4 and it should be noted that during this raised period vacuum may still be applied to the unit as the vacuum is delivered to the vacuum frame portion through the hollow support portion 72 and line 84**.

Several safety locking mechanisms are provided for the vacuum frame structure and applicant has contemplated and provided certain switches or the like such as a first switch 96 mounted in the first mentioned longitudinal support member 71 to abut with the forward extending portion of the bottom support frame which will prevent actuation of the device and prevent movement of the illuminating section 23 unless this switch has been actuated. A second such device may also be provided with the top frame element 90, this second switch not being illustrated. The purpose of such switches should be obvious in that if the frames were in an upward position the illuminating device 23 would not be free to travel along its path.

One other safety element is provided through the utilization of the particular motor 21 and the chain and drive structure. This particular device utilized may obviously be built into the motor or connected to shaft 29 and basically consists of a torque limiter. The function of this safety element is that if the torque necessary to drive the illuminating unit 23 along its path exceeds a predetermined amount the torque limiter will disengage the direct drive to the motor position and the travel of the luminating device 23 will be stopped.

In this specification there has been a discussion of four specific safety features built into the device and obviously more such safety features such as a vacuum sensing safety system could be installed to prevent operation of the unit unless certain predetermined conditions are met.

In operation of the device it should be assumed that the luminating head 23 is displaced at one end of its possible travel. The upper frame member 90 is unlatched and lifted to permit access to the lower supporting glass frame 80. An image plate is placed on the glass frame covered by the sensitized plate and another image plate is placed thereon. The top frame element 90 is then closed and latched and at this time vacuum is applied to the vacuum frame area. When sufficient vacuum has been applied to properly hold and position the plates it will be possible to check alignment of the bottom plate by lifting the entire closed frame unit. This is possible by releasing the latch 76 and rotating the entire vacuum frame unit and support bar 72 about its pivots **73*a*–73*b***. The frame is then replaced into proper exposure position and secured thereto and the motor travel is initiated and this travel is regulated to expose the plates in a single pass of the unit or preselected number of passes of the unit.

The utilization of the dual exposure arrangement obviously permits exposure of both sides of a plate at the same time. This then eliminates all possible repositioning and realignment of the plates as is necessary in the devices currently being utilized.

It should be obvious that applicant has provided a new and unique exposure device having certain safety devices incorporated therein which insure proper and positive operation of the unit and which unit is particularly designed to expose both sides of sensitized plates on a single exposure pass.

It will, of course, be understood that various changes may be made in the form, details, arrangements and proportion of parts without departing from the scope of my invention, which generally stated consists in the matter set forth in the appended claims.

What is claimed is:

1. Apparatus for exposing photosensitized plates comprising:

(a) a base;

(b) support means carried by said base;

(c) an exposure frame provided on said support means, said frame being of a first predetermined longitudinal dimension and having:

(1) a first light transmitting support surface for receiving the material to be exposed thereon;

(2) a second light transmitting surface arranged in generally overlying relation to said first surface for holding the materials to be exposed therebetween;

(3) means for positively clamping said surfaces into closely held adjacent relation to positively hold the material therebetween;

(d) guide means carried by said base being of a predetermined dimension greater than the predetermined dimension of said exposure frame;

(1) means for simultaneously exposing both sides of said exposure area; and (2) means for moving said carrier across and beyond said exposure frame to allow access to said frame.

2. The structure set forth in claim 1 and said guide means being of such a length to permit said carrier to be moved beyond said exposure frame in either direction.

3. The structure set forth in claim 1 wherein said means for moving said carrier across said exposure area includes motor means arranged to drive said carrier along said guide means having driving force sensing means associated therewith preventing movement of said carrier upon the driving force reaching a predetermined factor.

4. The structure set forth in claim 1 wherein said exposure means includes a pair of light sources arranged on opposite sides of said exposure to extend across the other dimension of said exposure area for simultaneously exposing the area.

5. The structure set forth in claim 4 and hood means arranged to extend around and substantially enclose said light sources while permitting illumination and exposure of the exposure area, and means for providing cooled air movement through said hood means.

6. The structure set forth in claim 5 and control means arranged and constructed to sense the movement of the air through said hood and arranged to prevent movement of said carrier when insufficient air is flowing therethrough.

7. The structure set forth in claim 1 and means for adjusting the rate of travel of said carrier across said exposure area.

8. The structure set forth in claim 1 wherein said lower surface is rotatably mounted on said supporting means to permit tilting thereof whereby the alignment of the plates mounted thereon may be visually checked.

9. The structure set forth in claim 1 wherein said means for moving said carrier across said exposure area includes motor means arranged to drive said carrier along said guide means having torque sensing means associated therewith preventing movement of said carrier upon the torque reaching a predetermined factor.

10. The structure set forth in claim 1 and sensing means associated with said first support surface to sense the position of said surface and controlling the means for moving said carrier preventing movement thereof when said support surface is in tilted position.

11. The structure set forth in claim 1 and said second surface being of a substantially flexible material to allow conformance thereof to said first plate and said material held thereon.

12. The structure set forth in claim 11 wherein said second surface is tiltably connected to said supporting means to allow access to said exposure area and control switch means are provided in association therewith preventing movement of said carrier when said second surface is positioned relatively distant from said first support area.

References Cited

UNITED STATES PATENTS

| | | | |
|---|---|---|---|
| 2,720,146 | 10/1955 | Mears | 355—89 |
| 3,007,390 | 11/1961 | Forester et al. | 355—84 |
| 3,385,193 | 5/1968 | Dougherty et al. | 355—93 |
| 1,261,177 | 4/1918 | Strong | 355—114 |
| 2,814,975 | 10/1955 | Mears | 355—91 |

FOREIGN PATENTS

| | | |
|---|---|---|
| 416,258 | 1934 | Great Britain. |

NORTON ANSHER, Primary Examiner

R. L. MOSES, Assistant Examiner

U.S. Cl. X.R.

355—84, 91

UNITED STATES PATENT OFFICE
CERTIFICATE OF CORRECTION

Patent No. 3,479,121 Dated November 18, 1969

Inventor(s) DENNIS A. BURGESS

It is certified that error appears in the above-identified patent and that said Letters Patent are hereby corrected as shown below:

Column 6 line 24 (claim 1 line 19)
insert --and-- at the end thereof;
between lines 24 and 25 (lines
19 and 20) insert the following
--e. carrier means mounted on
said guide means, including--;
line 67 (claim 10 line 1)
cancel "1" and insert --6--.

SIGNED AND
SEALED
JUN 2 1970

(SEAL)
Attest:

Edward M. Fletcher, Jr.
Attesting Officer

WILLIAM E. SCHUYLER, JR.
Commissioner of Patents